UNITED STATES PATENT OFFICE 2,552,072

PRODUCTION OF BIS-CYANOALKYL AMINES BY AMMONOLYSIS OF CHLORALKYL CYANIDES

John W. Teter and Jerome L. Mostek, Chicago, Ill., assignors to Sinclair Refining Company, New York, N. Y., a corporation of Maine No Drawing. Application August 1, 1945, Serial No. 608,355

1 Claim. (Cl. 260—465.5)

This invention relates to improvements in the production of bis-(cyanoalkyl)-amines, and includes two new such amines, namely, bis-(alpha-cyanopropyl)-amine and bis-(gamma-cyanopropyl)-amine.

In accordance with the present invention the bis-(cyanoalkyl)-amines are prepared by the reaction of anhydrous liquid ammonia with monochloralkyl cyanides, with heating of the reaction mixture at elevated temperatures under reduced pressure. While the mechanism of the reaction is not fully understood, it is thought that the reaction proceeds with formation of a monoaminoalkyl cyanide, two molecules of which subsequently condense with elimination of ammonia in accordance with the equation—

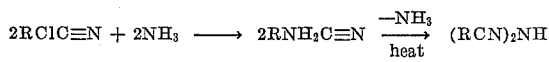

The second step of the reaction is favored by elevated temperatures and reduced pressures. Thus in the initial stage of the reaction, the liquid ammonia may be reacted with the chloralkyl cyanide at approximately room temperature or lower temperatures for a substantial period of time following which the excess ammonia is removed by releasing the pressure. The reaction product is then heated at reduced pressure, for example, to temperatures in excess of 100° C. or higher, advantageously about 200° C. and pressures of 200–250 mm. The dicyanoalkyl-amines are isolated from the resulting product by vacuum distillation or dissolving them in absolute alcohol or other solvent and crystallizing by vacuum evaporation. The products are heavy liquids or crystalline solids at room temperature and form salts with acids which are crystalline products.

The invention will be illustrated by the following examples but it is not limited thereto.

*Example.*—78.5 volumes of 3-chloropropionitrile were mixed with 200 volumes of liquid anhydrous ammonia in a pressure vessel maintained at 21–25° C. for 18 hours. The pressure was then released, the reaction mixture extracted from the residue with absolute alcohol, the solvent distilled off and the liquid residue heated to 200° C./250 mm. for 1 hour. The pressure was then reduced to 5 mm. and beta-aminopropionitrile present distilled off. The liquid temperature was then raised to 220° C. and the pressure reduced to 4 mm. In the course of raising the temperature, 48 volumes of bis-(beta-cyanoethyl)-amine came over at 165–166° C.

A similar procedure applied to 2-chlorobutyronitrile gives bis - (alpha - cyanopropyl) - amine, and applied to 4-chlorobutyronitrile gives bis-(gamma-cyanopropyl)-amine, these latter two being the new products of the invention.

We claim:

In a process for preparing bis(cyanoalkyl)-amines the improvement consisting of reacting a monochloralkyl cyanide with liquid anhydrous ammonia at temperatures not substantially in excess of room temperature and under pressure, then reducing the pressure to subatmospheric pressure and heating the reaction mixture to an elevated temperature.

JOHN W. TETER.
JEROME L. MOSTEK.

REFERENCES CITED

The following references are of record in the file of this patent:

UNITED STATES PATENTS

| Number | Name | Date |
|---|---|---|
| 1,992,615 | Hoffman et al. | Feb. 26, 1935 |
| 2,109,929 | Rigby | Mar. 1, 1938 |
| 2,163,594 | Engels et al. | June 27, 1939 |
| 2,195,974 | Reppe et al. | Apr. 2, 1940 |
| 2,298,739 | Lichty et al. | Oct. 13, 1942 |

FOREIGN PATENTS

| Number | Country | Date |
|---|---|---|
| 511,841 | Great Britain | Aug. 25, 1939 |

OTHER REFERENCES

Keil: Chem. Abst., vol. 22, p. 385 (1928).

Bruylants: Bull. Soc. Chim. Belg., vol. 32, p. 260.

Whitmore et al.: Jour. Am. Chem. Soc., vol. 66, pp. 725–731 (1944).